US011176944B2

(12) United States Patent
Boekweg et al.

(10) Patent No.: US 11,176,944 B2
(45) Date of Patent: Nov. 16, 2021

(54) TRANSCRIPTION SUMMARY PRESENTATION

(71) Applicant: Sorenson IP Holdings, LLC, Salt Lake City, UT (US)

(72) Inventors: Scott Boekweg, South Jordan, UT (US); David Thomson, North Salt Lake, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 133 days.

(21) Appl. No.: 16/408,826

(22) Filed: May 10, 2019

(65) Prior Publication Data
US 2020/0357408 A1 Nov. 12, 2020

(51) Int. Cl.
*G10L 15/30* (2013.01)
*G10L 15/26* (2006.01)
*G10L 21/18* (2013.01)

(52) U.S. Cl.
CPC .............. *G10L 15/26* (2013.01); *G10L 15/30* (2013.01); *G10L 21/18* (2013.01)

(58) Field of Classification Search
CPC ....... G10L 15/30; G10L 15/00; G10L 15/065; G10L 15/08; G10L 15/20; G10L 15/22; G10L 15/26; G10L 2015/225; G10L 2015/00; G10L 2015/08; G10L 2015/22; G10L 2015/228
USPC ....... 704/275, 231, 233, 235, 244, 251, 257, 704/276
See application file for complete search history.

(56) References Cited

U.S. PATENT DOCUMENTS

| 2003/0128820 | A1 | 7/2003 | Hirschberg et al. |
| 2007/0074116 | A1* | 3/2007 | Thomas ................ G11B 27/10 715/719 |
| 2007/0130257 | A1 | 6/2007 | Bedi et al. |
| 2008/0319744 | A1 | 12/2008 | Goldberg |
| 2010/0158213 | A1 | 6/2010 | Mikan et al. |
| 2010/0268534 | A1* | 10/2010 | Kishan Thambiratnam ................ G10L 15/26 704/235 |
| 2010/0299131 | A1 | 11/2010 | Lanham et al. |
| 2012/0179465 | A1 | 7/2012 | Cox et al. |
| 2016/0027442 | A1 | 1/2016 | Burton et al. |
| 2017/0083214 | A1* | 3/2017 | Furesjo ............... G06F 3/04845 |
| 2018/0012619 | A1 | 1/2018 | Ryan et al. |

(Continued)

FOREIGN PATENT DOCUMENTS

JP 2011087005 A 4/2011

*Primary Examiner* — Qi Han
(74) *Attorney, Agent, or Firm* — Maschoff Brennan

(57) ABSTRACT

A method to present a summary of a transcription may include obtaining, at a first device, audio directed to the first device from a second device during a communication session between the first device and the second device. Additionally, the method may include sending, from the first device, the audio to a transcription system. The method may include obtaining, at the first device, a transcription during the communication session from the transcription system based on the audio. Additionally, the method may include obtaining, at the first device, a summary of the transcription during the communication session. Additionally, the method may include presenting, on a display, both the summary and the transcription simultaneously during the communication session.

20 Claims, 6 Drawing Sheets

(56) References Cited

U.S. PATENT DOCUMENTS

2018/0212790 A1     7/2018    Jacobson et al.
2020/0004803 A1*   1/2020    Dernoncourt ........... G10L 15/18

\* cited by examiner

TRANSCRIPTION SUMMARY PRESENTATION

FIELD

The embodiments discussed in this disclosure are related to transcription summary presentation.

BACKGROUND

Transcriptions of audio communications between people may assist people that are hard-of-hearing or deaf to participate in the audio communications. To provide the transcriptions to a hard-of-hearing or deaf person, a particular device or application running on a mobile device or computer may be used to display text transcriptions of the audio being received by the hard of hearing or deaf person.

The subject matter claimed in this disclosure is not limited to embodiments that solve any disadvantages or that operate only in environments such as those described above. Rather, this background is only provided to illustrate one example technology area where some embodiments described in this disclosure may be practiced.

SUMMARY

A method to present a summary of a transcription may include obtaining, at a first device, audio directed to the first device from a second device during a communication session between the first device and the second device. Additionally, the method may include sending, from the first device, the audio to a transcription system. The method may include obtaining, at the first device, a transcription during the communication session from the transcription system based on the audio. Additionally, the method may include obtaining, at the first device, a summary of the transcription during the communication session. Additionally, the method may include presenting, on a display, both the summary and the transcription simultaneously during the communication session.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
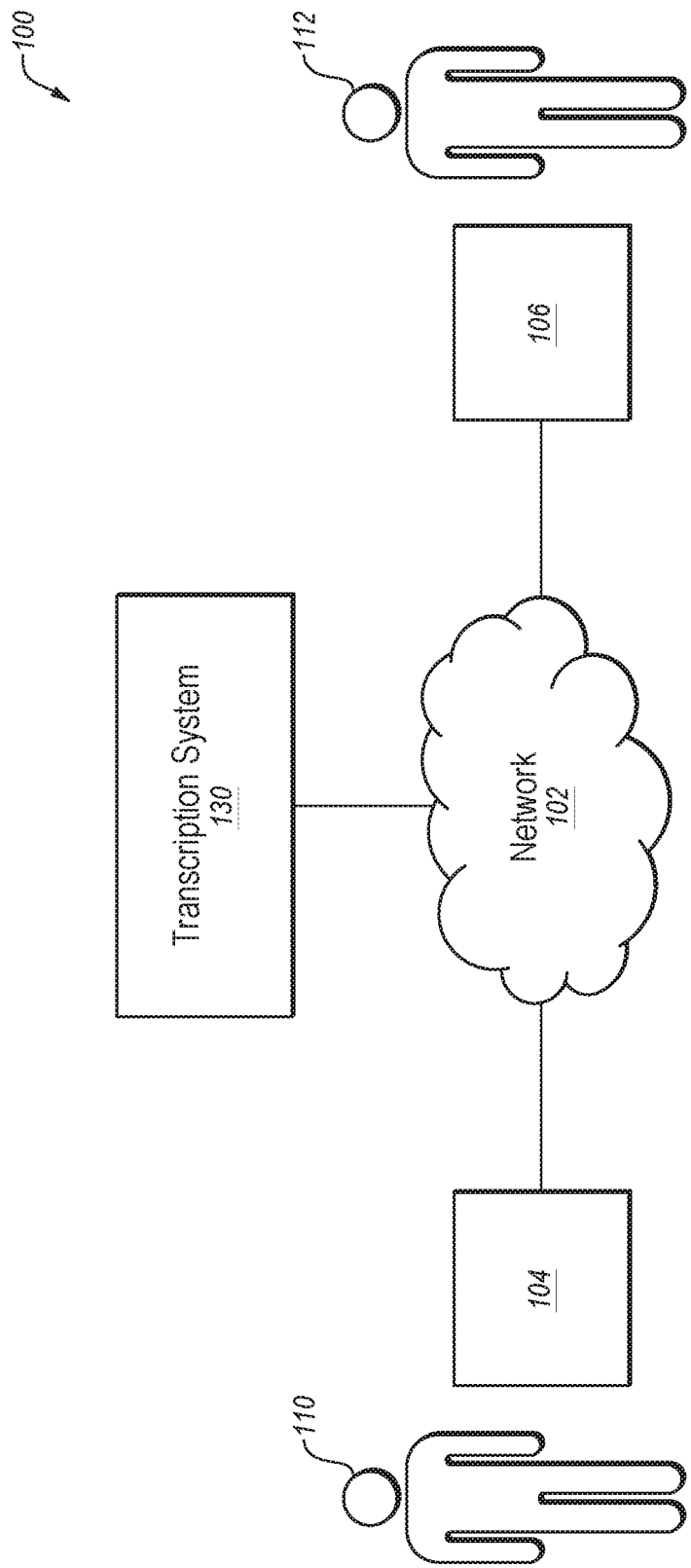
FIG. 1 illustrates an example environment for presentation of a summary of a transcription.

Transcribed audio of a communication session, in the form of a transcription may be generated by a transcription system. The transcription may be provided to a device for display to a user of the device. The transcription may assist the user to better understand what is being said during the communication session. However, in some instances, the transcription alone may be insufficient to help the user understand what is being said during the communication session. For example, the user may have a limited understanding of the transcription of the communication session due to low literacy aptitude, decreased vision, and/or cognitive disabilities.

Aspects of the present disclosure relate to systems and methods that may be used to present a summary of a transcription of a communication session on a device. Presentation of the transcription on the device and presentation of the summary on the device may be respectively referred to in this disclosure as "transcription presentation" and "summary presentation." In some embodiments, the transcription presentation and the summary presentation may both be performed simultaneously during a communication session. For example, a first device may obtain audio directed to the first device from a second device during a communication session between the first device and the second device. Additionally or alternatively, the first device may send the audio to a transcription system, and the first device may obtain the transcription during the communication session from the transcription system based on the audio. In some embodiments, the first device may obtain a summary of the transcription during the communication session, and the summary may be presented on a display along with the transcription. The summary may be presented, relative to the transcription, in any suitable way. For example, the summary may be presented to aid understanding of the transcription. For example, portions of the summary may be visually associated with portions of the transcription. Additionally or alternatively, the summary presentation and the transcription presentation may respectively include scrolling the summary and the transcription to move along the display as the communication session proceeds.

In some embodiments, summary presentation may be event-based. For example, a change in summary presentation may occur in response to an occurrence or non-occurrence of an event. As referred to in this disclosure, an "event" may include one or more of: any action performed by a user, any action performed upon the device, any movement of the device, and any change in a condition detected by the device. Examples of events may include pressing a button to enable the feature, an incoming call on the device, the start of the communication session, the user misunderstanding the transcription of the communication session, the user misunderstanding speech of the communication session, the user looking towards the display of the device, the user looking away from the display of the device, positioning the device (or a portion of the device such as a handset) next to an ear of the user, removing the device (or a portion of the device such as a handset) from the ear of the user, placing the device (or a portion of the device such as a handset) on an object, the user entering a noisy area, increasing/decreasing audio volume on the device, the user multi-tasking, the user standing up, the user sitting down, the user walking, the user moving in a chair, eyes of the user being closed, more than two speakers in the communication session, activating a particular call mode (e.g., conference call, speaker phone, etc.) on the device, the user giving a voice command to the device, the user driving a vehicle, etc.

In some embodiments, events may be determined based on detection of an indication of an event. As referred to in this disclosure, an "indication" of an event may include any measurable or detectable result, consequence, or outcome of the event relative to the user and/or the device. Examples of indications of an event may include, relative to the device, detected changes in light, sound (e.g., volume of sound in an environment of the device or volume of speech directed from another device in the communication session), motion, rotation, position, orientation, magnetization, acceleration, tilt, vibration, and biometrics (e.g., facial, retinal, voice). Additionally or alternatively, indications of an event may include detected key phrases (e.g., "say that again" or "huh"), repeated words (e.g., in the speech directed from another device), etc. Additionally or alternatively, examples of indications of an event may include, relative to the user, detected changes in facial expression, movement of the eyes, voice tone, etc.

In some embodiments, obtaining (e.g., via detecting or receiving) an indication of an event may trigger a change in summary presentation. In these or other embodiments, an indication of a given event may cause the summary presentation to start, stop (e.g., pause or end), or be maintained based on the type of the event. For example, obtaining an indication of a first event may stop an ongoing summary presentation. As another example, obtaining an indication of a second event may start the summary presentation. Furthermore, an indication of an event may cause the summary presentation to start or stop depending on a current status of the summary presentation.

In some embodiments, to determine whether any given event triggers a change in the summary presentation, the event and/or the associated indication of the event may be determined and compared to a threshold. Whether the summary presentation is stopped, started, or maintained may be based on the measured value associated with the event satisfying the threshold.

The systems and methods to present a summary of a transcription of a communication session based on indications of events may result in improved utility of a user device. For example, the systems and methods described in this disclosure may provide users with improved user experiences, such as a faster transitioning to improved conversational understanding. Specifically, for example, when a user is having a difficult time understanding the transcription presentation, the systems and methods described in this disclosure may remove intermediary user steps taken to remedy any understanding deficiencies of the transcription presentation. In removing the intermediary user steps, the user may more quickly improve conversational understanding and reduce an amount of lost conversation (e.g., conversation that goes unheard or misunderstood).

Additionally or alternatively, the systems and methods described in this disclosure may improve conversational understanding. For example, by supplementing the transcription presentation with the summary presentation, conversational understanding may be improved, and bandwidth or storage requirements in a backend server may be reduced due to a reduced amount of unnecessary or repeated transcription presentations. Additionally or alternatively, by increasing conversational understanding, a conversational efficiency may also improve and decrease a duration of the conversation, thereby extending a battery life of the user device (e.g., a mobile device) and/or shorten an overall amount of transcribing performed. Thus, this disclosure may improve technology and/or the associated technical field with respect to transcription presentation and summary presentation during a communication session.

Turning to the figures, FIG. 1 illustrates an example environment 100 for presentation of a summary of a transcription. The environment 100 may be arranged in accordance with at least one embodiment described in the present disclosure. The environment 100 may include a network 102, a first device 104, a second device 106, and a transcription system 130.

The network 102 may be configured to communicatively couple the first device 104, the second device 106, and the transcription system 130. In some embodiments, the network 102 may be any network or configuration of networks configured to send and receive communications between systems and devices. In some embodiments, the network 102 may include a conventional type network, a wired network, an optical network, and/or a wireless network, and may have numerous different configurations. In some embodiments, the network 102 may also be coupled to or may include portions of a telecommunications network, including telephone lines, for sending data in a variety of different communication protocols, such as a plain old telephone system (POTS).

Each of the first and second devices 104 and 106 may be any electronic or digital computing device. For example, each of the first and second devices 104 and 106 may include a desktop computer, a laptop computer, a smartphone, a mobile phone, a tablet computer, a telephone, a phone console, a caption device, a captioning telephone, a TV, a smart device (e.g., an Amazon® Firestick, an Apple® TV, etc.), a smart monitor/display, a vehicle display, a home-control display, a home appliance display, or any other computing device that may be used for communication between users of the first and second devices 104 and 106.

In some embodiments, each of the first device 104 and the second device 106 may include memory and at least one processor, which are configured to perform operations as described in this disclosure, among other operations. In some embodiments, each of the first device 104 and the second device 106 may include computer-readable instructions that are configured to be executed by each of the first device 104 and the second device 106 to perform operations described in this disclosure.

In some embodiments, each of the first and second devices 104 and 106 may be configured to establish communication sessions with other devices. For example, each of the first and second devices 104 and 106 may be configured to establish an outgoing communication session, such as a telephone call, video call, or other communication session, with another device over a telephone line or network. For example, each of the first device 104 and the second device 106 may communicate over a wireless cellular network, a wireless network, a wired Ethernet network, an optical network, or a POTS line.

In some embodiments, each of the first and second devices 104 and 106 may be configured to obtain audio during a communication session. The audio may be part of a video communication or an audio communication, such as a telephone call. As used in this disclosure, the term audio may be used generically to refer to sounds that may include spoken words or descriptions of sounds such as ringing, laughing, a new voice, etc. Furthermore, the term "audio" may be used generically to include audio in any format, such as a digital format, an analog format, or a propagating wave format. Furthermore, in the digital format, the audio may be compressed using different types of compression schemes. Also, as used in this disclosure, the term video may be used generically to refer to a compilation of images that may be reproduced in a sequence to produce video.

As an example of obtaining audio, the first device 104 may be configured to obtain first audio. For example, the first device 104 may obtain the first audio from a microphone of the first device 104 or from another device that is communicatively coupled to the first device 104.

In some embodiments, the second device 106 may be configured to obtain second audio. For example, the second device 106 may obtain the second audio from a microphone of the second device 106 or from another device communicatively coupled to the second device 106. During the communication session, the second device 106 may provide the second audio to the first device 104. Alternatively or additionally, the first device 104 may provide the first audio to the second device 106. One or both of the first device 104 and the second device 106 may be configured to provide the first audio, the second audio, or both the first audio and the second audio to the transcription system 130.

In some embodiments, transcription generation may include either one or both of the first device 104 and the second device 106 providing audio obtained during a communication session to the transcription system 130. For example, the first device 104 may provide audio obtained from the second device 106 of the second user 112 during the communication session. In these and other embodiments, the transcription system 130 may be configured to generate a transcription of the audio received from either one or both of the first device 104 and the second device 106. The transcription system 130 may also provide the generated transcription of the audio to either one or both of the first device 104 and the second device 106. Either one or both of the first device 104 and the second device 106 may be configured to present the transcription received from the transcription system 130. For example, the first device 104 may be configured to a present the received transcriptions on a display that is part of the first device 104 or that is communicatively coupled to the first device 104.

The transcription system 130 may be configured to generate a transcription of audio using a speech recognition system. In some embodiments, the transcription system 130 may include any configuration of hardware, such as processors, servers, and database servers that are networked together and configured to perform a task. For example, the transcription system 130 may include one or multiple computing systems, such as multiple servers that each include memory and at least one processor.

The speech recognition system of the transcription system 130 may be configured to generate transcriptions from audio. In these and other embodiments, the speech recognition system may be configured to recognize speech in the audio. Based on the recognized speech, the speech recognition system may output a transcription of the speech. The transcription may be a written version of the speech in the audio. In some embodiments, the speech recognition system may be automatic systems that automatically recognize speech independent of human interaction to generate the transcription. In these and other embodiments, the speech recognition system may include speech engines that are trained to recognize speech. The speech engines may be trained for general speech and not specifically trained using speech patterns of the participants in the communication session, e.g., the first user 110 or the second user 112. Alternatively or additionally, the speech engines may be specifically trained using speech patterns of one of the participants of the communication session. Alternatively or additionally, the speech recognition system may be a revoicing transcription system.

In some embodiments, one or both of the first and second devices 104 and 106 may be configured to obtain a summary of the transcription. The summary of the transcription may include a simplified form of the transcription. As examples, the summary may include, based on the transcription: a reduced word count, smaller or less complex words, bullet points, main concepts, paraphrasing, acronyms, slang, key words, or any other suitable type of summary that simplifies the transcription. In these or other embodiments, summary presentation may be customized according to user preferences and/or user understanding. For example, the summary may include larger font, bolded text, highlighted text, underlined text, annotations, familiar terms, user-preferred word alternatives, etc. Additionally or alternatively, the summary may include a summary scroll rate at which the summary may move along the display. The summary scroll rate may be the same as or similar to a transcription scroll rate at which the transcription may move along the display. In some embodiments, the summary scroll rate and the transcription scroll rate may include different speeds. Additionally or alternatively, one or both of the summary scroll rate and the transcription scroll rate may be set at default settings, customized according to user preferences, and/or adjusted on-the-fly according to an indication of an event such as user misunderstanding described further below. Additional details regarding summary presentation and transcription presentation at the display may also be described below in conjunction with FIGS. 2, 3A, and 3B.

In some embodiments, one or both of the first and second devices 104 and 106 may obtain the summary of the transcription by generating the summary. In these or other embodiments, generating the summary at one or both of the first and second devices 104 and 106 may include receiving the transcription of the communication session from the transcription system 130. Thus, in some embodiments, one or both of the first and second devices 104 and 106 may be configured to generate the summary of the transcription of audio using a summary generation system.

The summary generation system of one or both of the first and second devices 104 and 106 may be configured to generate summaries of a transcription of audio from a communication session. In these and other embodiments, the summary generation system may be configured to obtain a meaning or context of text in the transcription. In some embodiments, the summary generation system may be an automatic system that automatically understands text independent of human interaction to generate the summary. In these or other embodiments, the summary generation system may include engines that are trained to understand text. Based on the understood text, the summary generation system may output or cause to output a summary of the transcription, for example, at a display. For example, the first device 104 may be configured to present the summary on a display that is part of the first device 104 or that is communicatively coupled to the first device 104. In these or other embodiments, the transcription and the summary may be presented simultaneously on the display. For instance, the transcription and the summary may be visually associated together when presented at the display at a same time during a communication session.

For example, in some embodiments, the summary may be generated by text extraction. Text extraction may include selecting phrases and/or sentences from the transcription that are included in the summary of the transcription. In these and other embodiments, the summary generation system may be configured to identify phrases/sentences in the transcription. The summary generation system may identify phrases/sentences in the transcription based on parsing of the transcription using punctuation, grammatical structure of the transcription, among other methods. After identifying the phrases, the summary generation system may rank the phrases based on relevance to the meaning of the transcription. For example, the summary generation system may use a text rank model described by Rada Mihalcea and Paul Tarau that graphs words as vertices and couples vertices using edges. Using the graph, the words may be ranked and based on the ranking of the words, the phrases and/or sentences may be ranked. The highest ranking sentences and/or phrases may be selected as the summary of the transcription. The summary generation system may also use other methods to identify phrases/sentences that may be used in the summary of the transcription.

As another example, in some embodiments, the summary may be generated by text abstraction. Text abstraction may include generating new phrases and sentences that capture the meaning of the source document. For example, machine learning models, such as neural networks, may be trained to generate summaries of text. For example, an example implementation of summarizing text by abstraction is described in the paper "Get To The Point: Summarization with Pointer-Generator Networks" by Abigail See, Peter J. Liu, Christopher D. Manning, which is incorporated herein by reference in its entirety.

In some embodiments, one or both of the first and second devices 104 and 106 may obtain the summary of the transcription by receiving the summary. In these or other embodiments, receiving the summary at one or both of the first and second devices 104 and 106 may include receiving the summary of the transcription of the communication session as generated by the transcription system 130. Thus, in some embodiments, the transcription system 130 may be configured to generate the summary of the transcription of audio using a summary generation system. The summary generation system of the transcription system 130 may be the same as or similar to the summary generation system of one or both of the first and second devices 104 and 106 described above. Additionally or alternatively, one or both of the first and second devices 104 and 106 may obtain the summary of the transcription by receiving the summary via re-voicing systems. For example, an agent connected to the transcription system 130 may voice the summary, based on the transcription and/or the audio of the communication session, in vocal form to be transcribed at the transcription system 130 and sent to one or both of the first and second devices 104 and 106. Additionally or alternatively, one or both of the first and second devices 104 and 106 may obtain the summary of the transcription by receiving the summary as manually input (e.g., typed) via agent translation of the transcription and/or the audio of the communication session.

In some embodiments, one or both of the first and second devices 104 and 106 may be configured to obtain an indication of an occurrence of an event. For example, each of the first device 104 and the second device 106 may include a sensor (and/or may be communicatively coupled to a sensor) to sense the indication of the event. Examples of sensors may include a microphone, a speaker, an accelerometer, a gyroscope, a proximity sensor, a barometer, a light sensor, a magnetometer (e.g., compass), a global positioning system "GPS" sensor, an infrared sensor, a 3-dimensional sensor (e.g., for facial recognition, virtual reality or augmented reality applications, etc.) a camera, a spectrometer, a fingerprint sensor, a heart rate monitor, other biometric sensors, and/or any suitable sensor configured to be compatible with the first and second devices 104 and 106. For example, the sensor communicatively coupled to the first device 104 may sense, relative to the first device 104, changes in light, sound (e.g., volume of sound in an environment of the device or volume of speech directed from another device in the communication session), motion, rotation, position, orientation, magnetization, acceleration, tilt, vibration, and biometrics (e.g., facial, retinal, voice). Additionally or alternatively, the same sensor and/or a different sensor communicatively coupled to the first device 104 may sense, relative to the first user 110, changes in facial expression, movement of the eyes, voice tone, etc. Additionally or alternatively, the sensor communicatively coupled to the first device 104 may sense key phrases (e.g., "say that again" or "huh") spoken by the first user 110, repeated words (e.g., in the speech directed from the second device 106), etc. via speech recognition capabilities of the sensor. In other embodiments, the key phrases (e.g., "say that again" or "huh") spoken by the first user 110, repeated words (e.g., in the speech directed from the second device 106), etc. may be included in the transcription of the communication session. Thus, in some embodiments, the transcription may be reviewed and determined to include text corresponding to the key phrases and/or repeated words spoken in the communication session.

In these or other embodiments, the same sensor and/or a different sensor communicatively coupled to the second device 106 may sense, relative to the second user 112 associated with the second device 106, changes in light, sound (e.g., volume of sound in an environment of the device or volume of speech directed from another device in the communication session), motion, rotation, position, orientation, magnetization, acceleration, tilt, vibration, and biometrics (e.g., facial, retinal, voice). Additionally or alternatively, the same sensor and/or a different sensor communicatively coupled to the second device 106 may sense, relative to the second user 112, changes in facial expression, movement of the eyes, voice tone, etc. Additionally or alternatively, the sensor communicatively coupled to the second device 106 may sense key phrases (e.g., "say that again" or "huh") in the speech directed from the first device 104, etc. via speech recognition capabilities of the sensor. Thus, in some embodiments, the first and second devices 104 and 106 may be configured to detect indications of events based on the indications of such events occurring and being detectable on one or both of a device level (e.g., the first and second devices 104 and 106) and a user level (e.g., the first and second users 110 and 112). In other embodiments, the key phrases (e.g., "say that again" or "huh") spoken by the second user 112, repeated words (e.g., in the speech directed from the first device 104), etc. may be included in the transcription of the communication session. Thus, in some embodiments, the transcription may be reviewed and determined to include text corresponding to the key phrases and/or repeated words spoken in the communication session.

In some embodiments, indications of an event may be associated with a level such as an extent or degree at which the event is occurring. For example, in the scenario in which the event includes misunderstanding of the first user 110, indications of the event may be indicative of a level of understanding (or misunderstanding) of the first user 110. In some embodiments, one or both of the first and second devices 104 and 106 may be configured to compare the level of user understanding to a particular level of user understanding, such as a threshold level of user understanding. For example, each of the first and second devices 104 and 106 may compare the level of user understanding based on a detected indication of an event with the threshold level of user understanding using any suitable technique as performable by a processor. In response to the comparison, one or both of the first and second devices 104 and 106 may alter summary presentation. Thus, in some embodiments, the first and/or second devices 104 and 106 may cease presenting, start presenting, maintain presenting, or continue without presenting the summary presentation in response to the comparison of the duration of the event with the threshold amount of time.

In some embodiments, one or both of the first and second devices 104 and 106 may be configured to determine a duration of events. In these and other embodiments, the duration of the event may be determined by the first and second devices 104 and 106. For example, the first and second devices 104 and 106 may be equipped with one or more of a processor, a timing element (a clock, timer, etc. configured to emit pulses), a timing circuit, an oscillator (e.g., a crystal oscillator), and a counter, or any suitable timing component to measure the duration of the indication of the event. In some embodiments, the duration of an event may be based on an amount of time that occurs from the indication of the event until an indication is obtained that the event has stopped. In some embodiments, an indication of an event may be determined before an indication is obtained that the event has stopped. For example, if an indication of an event is received, the event may have a duration that is increasing until an indication is obtained that the event has stopped. Thus, a duration of an event may be determined in real-time as the event is occurring and may not be limited to determining the duration until an indication is obtained that the event has stopped. As examples, duration of an event may correspond to an amount of time between which one or both of the first and second devices 104 and 106 sense key phrases (e.g., "say that again" or "huh"), repeated words (e.g., in the speech directed from the other device), and/or change in light, sound, motion, rotation, position, orientation, magnetization, acceleration, tilt, vibration, facial expression, eye movement, voice tone, etc.

In some embodiments, one or both of the first and second devices 104 and 106 may be configured to compare the duration of the event to a particular amount of time, such as a threshold amount of time. For example, each of the first and second devices 104 and 106 may compare the amount of time from when an indication of an event is detected with the threshold amount of time using any suitable technique as performable by a processor. In response to the comparison, one or both of the first and second devices 104 and 106 may alter summary presentation. Thus, in some embodiments, the first and/or second devices 104 and 106 may cease presenting, start presenting, maintain presenting, or continue without presenting the summary presentation in response to the comparison of the duration of the event with the threshold amount of time.

An example with respect to the environment 100 of FIG. 1 is now provided. A communication session may be established between the first device 104 and the second device 106. A sensor communicatively coupled to the first device 104 may obtain data that may indicate an event. The event may indicate that the first user 110 associated with the first device 104 is misunderstanding what is presented on a display, specifically a transcription of the communication session between the first device 104 and the second device 106. The display may be part of the first device 104 or may be part of another device (e.g., a television, a monitor screen, a mobile device, etc. communicatively coupled to the first device 104). In some embodiments, in response to the event occurring, the first device 104 may start summary presentation, instruct the start of summary presentation, be instructed to start summary presentation, and/or continue with summary presentation.

Alternatively or additionally, after the sensor obtains data that may indicate an event, the first device 104 may determine a level of user understanding. As an example, a detected facial expression including a furrowed brow or other perplexed expression may be associated with a medium level of user misunderstanding or a score of about 10% user misunderstanding. As another example, an increase in sound volume of the audio directed from the second device 106 to the first device 104 may be associated with a lower level of user misunderstanding or a score of about 5% user misunderstanding. As another example, a number of repeated words in the audio directed from the second device 106 to the first device 104 may be associated with a higher level of user misunderstanding or a score of about 15% user misunderstanding. In yet another example, key phrases in the audio directed from the second device 106 to the first device 104 may be associated with a higher level of user misunderstanding or a score of about 20% user misunderstanding. In these or other embodiments, indications of events may be associated with higher or lower levels of user misunderstanding than the examples provided in this disclosure. Additionally or alternatively, combinations of indications of events may be combined such that a higher or lower level of user misunderstanding is determined. The first device 104 may compare the determined level of user understanding with a threshold level of user understanding. In response to the determined level of user understanding/misunderstanding satisfying the threshold level of user understanding/misunderstanding, the first device 104 may start summary presentation, instruct the start of summary presentation, be instructed to start summary presentation, and/or continue with summary presentation.

Alternatively or additionally, after the sensor obtains data that may indicate an event, the first device 104 may determine a duration from the beginning of the event. The duration of the event may continue until the sensor may obtain data that may indicate the event has stopped occurring. The first device 104 may compare the determined duration with a threshold amount of time. In response to the duration exceeding the threshold amount of time, the first device 104 may start summary presentation, instruct the start of summary presentation, be instructed to start summary presentation, and/or continue with summary presentation.

In another example, a communication session may be established between the first device 104 and the second device 106. The transcription of the communication session between the first device 104 and the second device 106 may be presented at a display (e.g., of the first device 104). A sensor communicatively coupled to the first device 104 may obtain data that may indicate an event. The event may indicate that the first user 110 associated with the first device 104 is understanding the transcription presented on the display. In some embodiments, in response to the event occurring, the first device 104 may stop summary presentation, instruct the stop of summary presentation, be instructed to stop summary presentation, and/or continue without summary presentation.

Alternatively or additionally, after the sensor obtains data that may indicate an event, the first device 104 may determine a level of user understanding. For example, a facial expression of the first user 110 associated with understanding may be detected. In another example, the first user 110 may be detected as not reading the summary of the transcription, which may be associated with higher levels of user understanding of the transcription. The first device 104 may compare the determined level of user understanding with a threshold level of user understanding. In response to the determined level of user understanding/misunderstanding satisfying the threshold level of user understanding/misunderstanding, the first device 104 may stop summary presentation, instruct the stop of summary presentation, be instructed to stop summary presentation, and/or continue without summary presentation.

Alternatively or additionally, after the sensor obtains data that may indicate an event, the first device 104 may determine a duration for which the first user 110 is sufficiently understanding the transcription. The first device 104 may compare the determined duration with a threshold amount of time. In response to the duration exceeding the threshold amount of time, the first device 104 may stop summary presentation, instruct the stop of summary presentation, be instructed to stop summary presentation, and/or continue without summary presentation.

In these or other embodiments, the first device 104 or the second device 106 may provide the audio from the second device 106 to the transcription system 130. In some embodiments, the first device 104 may provide generated sensory data of the sensing of the indication of the above example events to the transcription system 130. Additionally or alternatively, the transcription system 130 may be configured to perform, in the same or a similar manner, one or more steps described above as performed by the first device 104 and the second device 106, steps such as: determining a level of user understanding, comparing the level of user understanding with a threshold level of user understanding, determining a duration of the event, comparing the duration of the event with a threshold amount of time, and directing the display to present or cease presenting the transcription of the communication session between the first device 104 and the second device 106 in response to any of the comparing.

Modifications, additions, or omissions may be made to the environment 100 without departing from the scope of the present disclosure. For example, in some embodiments, the environment 100 may include additional devices. In these and other embodiments, the additional devices may be configured to present a summary of a transcription of a communication session based on obtaining an indication of an event as described in this disclosure. For example, the first device 104 may receive a request for a communication from the second device 106. A third device may alert the first user 110 of the request and capture audio of the first user 110. Alternatively or additionally, a fourth device may generate sensory data of the first user 110 and/or the first device 104, and a fifth device may present summaries to the first user 110. In these and other embodiments, each of the first device 104, the third device, the fourth device, and the fifth device may be associated with the first user 110, communicatively coupled, and coordinated to perform operations as described with respect to the first device 104 in this disclosure.

Figure 2:
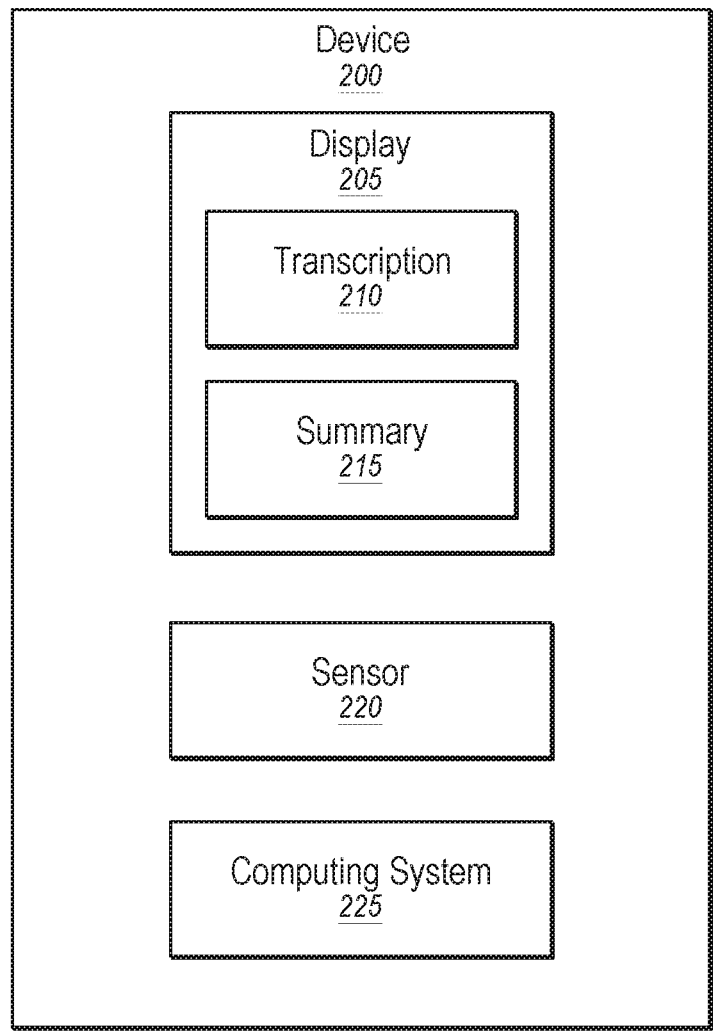
FIG. 2 illustrates an example block diagram of a device for use in the presentation of a summary of a transcription.

FIG. 2 illustrates an example block diagram of a device 200 for use in the presentation of a summary of a transcription of communication. The device 200 may be arranged in accordance with at least one embodiment described in the present disclosure. The device 200 may include a display 205, a transcription 210, a summary 215, a sensor 220, and a computing system 225. The device 200 may be the same as or similar to one or both of the first device 104 and the second device 106 of FIG. 1. The computing system 225 may be the same as or similar to the system 400 described below in conjunction with FIG. 4.

In some embodiments, the display 205 may include any screen, window, monitor, TV, viewing environment, virtual reality setting, interactive element, and/or any other suitable mechanism able to visually present the transcription 210 and the summary 215. In some embodiments, the display 205 may be part of the device 200, while in other embodiments, separate from the device 200 (albeit communicatively coupled to the device 200). Thus, although the display 205 is depicted in FIG. 2 as part of the device 200, the display 205 may be physically separate from the device 200. For example, the device 200 may include a smartphone, and the display 205 may include a TV screen communicatively coupled to the smartphone. Thus, in some embodiments, the display 205 may be part of a desktop computer, a laptop computer, a smartphone, a mobile phone, a tablet computer, a telephone, a phone console, a caption device, a captioning telephone, a TV, a smart device (e.g., an Amazon® Firestick, an Apple® TV, etc.), a smart monitor/display, a vehicle display, a home-control display, a home appliance display, or part of any other suitable device that may be used to present the transcription 210 and the summary 215.

In some embodiments, the transcription 210 may be configured to be displayed at the display 205 of the device 200. The transcription 210 may be a written version of audio in a communication session between the device 200 and a third party device such as the second device 106 of FIG. 1. Additionally or alternatively, the summary 215 may be configured to be displayed at the display 205 of the device 200. The summary 215 may be a simplified version of the transcription 210. For example, the summary 215 may include, based on the transcription 210: a reduced word count, smaller or less complex words, bullet points, main concepts, paraphrasing, acronyms, slang, key words, or any other suitable type of summary that simplifies the transcription 210. In these or other embodiments, the transcription 210 and the summary 215 may be presented simultaneously at the display 205. For example, the transcription 210 and the summary 215 may be visually associated together when presented at the display 205 at a same time during a communication session.

In some embodiments, the sensor 220 may be of any size, position, orientation, etc. on or within the device 200. The sensor 220 may include multiple sensors 220 and may include one or more of an accelerometer, a gyroscope, a force sensor (e.g., a pressure plate or pressure sensor), a proximity sensor, a barometer, a light sensor, a magnetometer (e.g., compass), a global positioning system "GPS" sensor, an infrared sensor, a 3-dimensional sensor (e.g., for facial recognition, virtual reality or augmented reality applications, etc.), a camera, a microphone, a speaker, a spectrometer, a fingerprint sensor, a heart rate monitor, other biometric sensors, and/or any suitable sensor.

In some embodiments, the sensor 220 may be configured to sense an indication of an event. Based on an indication of an event, the device 200 may be able to make a determination that the event occurred. Based on the determination that the event occurred, the device 200 may determine that the summary 215 of the transcription 210 may be helpful to the user. In response to the determination, the device 200 may begin or continue summary presentation. Alternatively, based on the determination that the event occurred, the device 200 may determine that the summary 215 of the transcription 210 may not be helpful to the user. In response to the determination, the device 200 may stop summary presentation or continue without summary presentation. For example, the device 200 may cause the display 205 to turn off, be "blacked" out, or otherwise render the summary presentation as unreadable to the user. Additionally or alternatively, the device 200 may cause the display 205 to remove the summary 215 from the display 205.

In some embodiments, the sensor 220 communicatively coupled to the device 200 may include a camera. In some embodiments, the device 200 may cause the camera to generate image data of the user. The image data may be a single image or multiple images over a period time that may be presented as a video. Based on the image data of the user, the device 200 may determine whether the user is understanding the transcription 210 on the display 205.

In some embodiments, the image data may include one or more of gaze points, heatmaps, areas of interest, and fixation sequences relative to the user. Each is discussed in turn. As referred to in this disclosure, gaze points may indicate which elements of a stimulus an eye of the user is looking at. In these or other embodiments, the sensor may collect gaze points at a predetermined frequency (e.g., 50Hz, in which case there would be 50 gaze points collected per second by the camera). When a series of gaze points is close, in time and space forming a cluster, the cluster may constitute a fixation point, denoting a period of time during which an eye of the user is fixed on an object. An object that the eye of the user may gaze upon or fix upon may include the display 205 of the device 200 and/or any element displayed thereon such as the transcription presentation. The camera may also collect data on eye movement between fixation points, generally referred to as "saccades." For example, the camera may detect that when a user is reading the transcription 210, the eye of the user fixes on, e.g., every third or fourth word depending on a visual span of the user that measures how many words the user may read before and after a currently fixated word. In another example, based on the image data including gaze points, the device 200 may determine that the user is unable to adequately keep pace with reading the transcription 210, from which it may be inferred that the user is unable to sufficiently understand the transcription 210.

In some embodiments, the image data may include heatmaps. As referred to in this disclosure, heatmaps may include a distribution of fixation points and gaze points. For example, the heatmap may include a color distribution indicating higher, moderate, and lower levels of attention. Additionally or alternatively, analysis of heatmaps may help to visualize which elements in an environment attract more attention of the user than others. Based on which elements in an environment attract more attention it may be determined whether the user is understanding the transcription 210 on the display 205.

In some embodiments, the image data may include areas of interest. As referred to in this disclosure, an area of interest may include one or more selectable sub-regions of a displayed stimuli and extractable metrics corresponding to the one or more selectable sub-regions of the displayed stimuli. For example, the display 205 may include multiple areas of interest such as a region designated to display the transcription presentation, another region designated to display the summary presentation, another region designated to display a caller identification, another region designated to display a date, a clock or a call-time duration, etc. Additionally or alternatively, the display 205 may be a single area of interest, and other objects or stimuli in the environment of the user may be other areas of interest. In these or other embodiments, example metrics corresponding to the one or more areas of interest may include a time to first fixation ("TTFF"), time spent, and ratio. The TTFF metric may include an amount of time that it takes a user (or an average of multiple users) to look at a specific area of interest from stimulus onset (e.g., as measured from a point in time when the summary presentation begins being displayed on the display 205).

The time spent metric may include an amount of time that a user responds to or spends on an area of interest. Larger amounts of time spent on a given area of interest may indicate a higher level of interest of the user. Smaller amounts of time spent on the given area of interest may indicate a lower level of interest of the user. For example, larger amounts of time spent on a given area of interest corresponding to the transcription presentation may be used to determine that the user is viewing the transcription presentation, from which it may be inferred that the user is understanding the transcription 210. Smaller amounts of time spent on the given area of interest corresponding to the transcription presentation may be used to determine that the user is not viewing the transcription presentation, from which it may be inferred that the user is not understanding the transcription 210. Additionally or alternatively, smaller amounts of time spent on a given area of interest corresponding to the summary presentation may be used to determine that the user is understanding the transcription 210. Additionally or alternatively, larger amounts of time spent on a given area of interest corresponding to the summary presentation may be used to determine that the user is not understanding the transcription 210. The ratio metric may include information about how a user responds to a certain area of interest relative to one or more other areas of interest. The ratio metric may include the TTFF metric or the time spent metric, among other suitable metrics.

In some embodiments, the image data may include fixation sequences. As referred to in this disclosure, a fixation sequence is a mapping that indicates an order of attention of the user (e.g., sequential or chronological order). In these or other embodiments, the fixation sequence may help the camera of the device 200 determine that the user is viewing the summary 215. For example, the camera of the device 200 may detect a fixation sequence that repeats or toggles between two or more fixation points indicating that the user is viewing (e.g., reading) the summary 215. Additionally or alternatively, the summary presentation and the camera may be synced such that a manner in which the summary 215 is presented (e.g., placement, speed, substitution of lines or paragraphs, moving lines or paragraphs, etc.) may correspond to a particular fixation sequence. Should the eye(s) of the user be detected by the camera of the device 200 to follow the particular fixation sequence exactly or approximately within about 60% accuracy, about 70% accuracy, about 80% accuracy, about 90% accuracy, or some other percentage of accuracy, the user may be determined as viewing the summary 215.

In these or other embodiments in which the camera is the sensor 220, the device 200 may cause the camera to generate the image data of the user. Based on the image data, it may be determined that the user is viewing the summary 215 via eye tracking software and/or eye tracking hardware within the camera and/or the device 200, and therefore that the user requires or prefers assistance in understanding the transcription 210. Additionally or alternatively, based on the image data, it may be determined that a facial expression exhibited by a user is a facial expression associated with a level of misunderstanding of the user. Additionally or alternatively, based on the image data, it may be determined that the user is viewing the transcription 210 via eye tracking software and/or eye tracking hardware within the camera and/or the device 200, and therefore that the user does not require or prefer assistance in understanding the transcription 210.

In some embodiments, multiple sensors 220 may be implemented. The multiple sensors 220 may be used for dual verification regarding whether a user is understanding the transcription 210. For instance, a microphone as a sensor 220 may detect an increase in sound volume directed to the device 200. Based on the increase in sound volume, the device 200 may make a determination that an event has occurred. In response to the determination that the event has occurred, the device 200 may satisfy one of multiple verification checks that may be used to verify that the event includes the user not understanding the transcription 210 within a threshold level of understanding. Based on the determination that the user is not understanding the transcription 210 within a threshold level of understanding, an inference may be made that the user may benefit from summary presentation. This may be a first verification check.

A second verification check may be satisfied based on image data from a camera as another sensor 220. For example, the camera may obtain image data of a facial expression of a user of the device 200. Based on the image data, the device 200 may determine that an event has occurred. In response to the determination that the event has occurred, the device 200 may satisfy another verification check that may be used to verify that the event includes the user not understanding the transcription 210 within a threshold level of understanding. Based on the determination that the user is, however, understanding the transcription 210 within a threshold level of understanding, an inference may be made that the user may not benefit from summary presentation. This may be a second verification check. In this example, the determination that the user is understanding the transcription 210 within a threshold level of understanding may be contrary to the first verification check based on the sound data from the microphone.

In these and other embodiments, when dual verification fails to verify either that a user is understanding or not understanding the transcription 210 within a threshold level of understanding, a change in the status of the summary presentation may not occur. For example, transcription presentation may continue along with summary presentation if summary presentation has already begun, or transcription presentation may continue without summary presentation if summary presentation is already not occurring. Alternatively, when dual verification fails to verify either that a user is understanding or not understanding the transcription 210 within a threshold level of understanding, a change in the status of the summary presentation may occur. For example, summary presentation may change from not occurring to occurring, or summary presentation may change from occurring to not occurring.

Additionally or alternatively, when dual verification does verify either that a user is understanding or not understanding the transcription 210 within a threshold level of understanding, a change in the status of the summary presentation may not occur. For example, transcription presentation may continue along with summary presentation if summary presentation has already begun, or transcription presentation may continue without summary presentation if summary presentation is already not occurring. Alternatively, when dual verification verifies either that a user is understanding or not understanding the transcription 210 within a threshold level of understanding, a change in the status of the summary presentation may occur. For example, summary presentation may change from not occurring to occurring, or summary presentation may change from occurring to not occurring.

As another example, a first sensor 220 may sense data from which the device 200 may determine a first event occurred. A second sensor 220 may sense data from which the device 200 may determine a second event occurred. A third sensor 220 may sense data from which the device 200 may determine a third event occurred. Based on the determination of the occurrence of all three events, the device 200 may determine that the user is not understanding the transcription 210. The device 200 may, in response to the determination, alter the summary presentation.

In these or other embodiments, one or more events may be weighted (e.g., according to statistical confidence relative to the user understanding the transcription 210, adjustable settings, etc.). For example, image/video data from the camera may be weighted more than sound data. In an example case, certain fixation points of the user detected by the camera indicating the user is likely viewing the summary 215 may be stronger evidence that the user does not understand the transcription 210 compared with sound data in the form of repeated words directed to a user of the device 200. In some embodiments, there may be less of an inference that the user prefers or needs the summary 215 to aid understanding of the transcription 210 with camera data in the form of fixation points than the sound data in the form of repeated words, which could also indicate other events and possibly false positives.

Additionally or alternatively, the device 200 may indicate a level of understanding of the user of the device 200 based on the determined occurrence of multiple events exceeding a threshold confidence level using weighted values of the determined multiple events. In some embodiments, one or more of the events as determined may be insufficient, alone, due to a corresponding weighted value for the device 200 to determine a level of user understanding of the transcription 210. Additionally or alternatively, one or more of the events as determined may be sufficient, alone, due to a corresponding weighted value for the device 200 to determine a level of user understanding of the transcription 210. In this manner, multiple sensors 220 may check each other. In these or other embodiments, multiple sensors 220 may be used to perform multi-verification checks that the device 200 may use to accurately determine whether the user understands the transcription 210 (from which may be inferred that the user may benefit from summary presentation). The device 200 may accordingly direct the display 205 to alter summary presentation.

Additionally or alternatively, multiple sensors may be implemented that individually or in combination may obtain data from which the occurrence of an event may be determined. Based on the occurrence of an event, the device 200 may determine a level of user understanding of the transcription 210. In response to the determination, the device 200 may alter summary presentation.

In some embodiments, the device 200 may direct the display 205 to present the summary 215 (e.g., after not presenting the summary 215) such that summary presentation includes communications of a communication session beginning at the time an indication of an event is detected by the sensor 220. Thus, in some embodiments, the summary 215 of the transcription 210 of a communication session may begin to be generated from the time of the event. For example, the device 200 may generate the summary using the point in the transcription that corresponds to the time of the event.

In other embodiments, the summary 215 may be generated from a time prior to the event. After generation of the summary 215, the summary 215 may be presented. For example, at the time an indication of an event is detected by the sensor 220, the device 200 may generate the summary 215 to summarize portions of the transcription that occur at a point in the communication session prior to the event. After generation of the summary, the device 200 may direct the display 205 to present the summary 215. For instance, summary presentation may include portions of the communication session in addition to what is being said in the communication session in real-time. In this manner, the user may, for example, more seamlessly transition from not understanding the transcription 210, thereby helping to reduce an amount of lost conversation. Thus, in some embodiments, altering of summary presentation as directed by the device 200 may improve conversational understanding during or after transition of the user not understanding the transcription 210 of a communication session.

In other embodiments, an event may occur, and in response to the event, the device 200 may direct the display 205 to transition from presenting the summary 215 of the transcription 210 of a communication to not presenting the summary 215 of the communication session. Thus, in some embodiments, summary presentation may continue for a limited time after a determination is made that a user is understanding the transcription 210 within a threshold level of understanding. Thus, in some embodiments, altering of summary presentation as directed by the device 200 may help reduce a resource or computational load on a network, transcription system, and/or the device 200.

In some embodiments, so that the device 200 may direct the display 205 to present the summary 215 beginning at certain points in the communication session, a transcription system such as the transcription system 130 of FIG. 1 may generate the summary 215 in various ways. For example, the transcription system may generate the summary 215 of the transcription 210 of the communication session at all times, regardless of whether the device 200 directs the display 205 to present the summary 215. Additionally or alternatively, the transcription system may store just portions of the generated summary 215. For example, the transcription system may delete the generated summary 215 in intervals (e.g., about five second intervals, about ten second intervals, about twenty second intervals, about thirty second intervals, about one minute intervals, etc.) for which no request was received (e.g., from the device 200) to present the summary 215. Should a request be received to present the summary 215 during a particular interval, the particular interval may not be deleted but the summary 215 of the particular interval may be provided for presentation of the summary 215 of the particular interval. Additionally or alternatively, deletion of one or more portions of the summary 215 may occur in response to summary presentation stopping (e.g., ending). Thus, in some embodiments, when summary presentation begins again, one or more portions of the summary 215 corresponding to a prior point in the communication session or a previous communication session may be unavailable.

In some embodiments, the transcription system such as the transcription system 130 of FIG. 1 may store the entirety of the transcription 210 of a communication session or just portions of the communication session regardless of whether the device 200 directs the display 205 to present the summary 215. As described above in conjunction with FIG. 1, the transcription system may use the transcription 210 of a communication session to generate the summary 215 of the communication session. In some embodiments, the transcription system, such as the transcription system 130 of FIG. 1, may store the communication session such that a certain amount of the transcription 210 of the communication session is continuously stored in a buffer.

For example, the transcription 210 of the communication session may be stored until the buffer is full. Once the buffer is full, in some embodiments, the transcription 210 may effectively slide through the buffer in a continuous manner such that the transcription 210 in real-time is continuously added to the buffer and the oldest portion of the transcription 210 is continually deleted from the buffer. The oldest portion of the transcription 210 may correspond to a point in the communication session about ten seconds prior to real-time, about thirty seconds prior to real-time, about sixty seconds prior to real-time, about ninety seconds prior to real-time, etc., depending on a length of the buffer. In these and other embodiments, once the buffer is full, the transcription 210 may effectively slide through the buffer in intervals (e.g., about 1 second intervals, about five second intervals, about ten second intervals, etc.) such that audio approximate to real-time and including real-time is added to the buffer in a single interval. About the same time as adding the newest single interval of the transcription 210 to the buffer, the oldest interval of the transcription 210 of a corresponding interval size is deleted from the buffer. Based on the stored transcription 210 in the buffer, the transcription system (such as the transcription system 130 of FIG. 1) may generate the summary 215.

In some embodiments, the transcription system may generate the summary 215 in response to a request from the device 200. The device 200 may send to the transcription system the request to generate the summary 215 in response to one or more determinations made by the device 200. For example, the device 200 may send the request to generate the summary 215 in response to obtaining an indication of an event, such as user misunderstanding, and determining that the user misunderstanding satisfies a threshold level of user misunderstanding. In response to the request, the device 200 may obtain the generated summary 215. After obtaining the generated summary 215, the device 200 may direct the display 205 to present the generated summary 215. In these and other embodiments, because the buffer may also include other portions (e.g., older portions) of the transcription 210, the generated summary 215 may include portions that correspond to portions of the transcription 210 before the device 200 sends the request to generate the summary 215. The additional portions of the summary 215 may assist a user of the device 200 to better understand the context of the transcription 210 and/or the summary 215.

Additionally or alternatively, the device 200 may notify the transcription system to stop generation of the summary 215. In response to the notification, the transcription system may cease generation of the summary 215.

In these or other embodiments, the transcription system may switch a process by which the transcription system generates the summary 215 based on indications of an occurrence of an event. For example, the transcription system may switch the process used to generate the summary 215 in response to data obtained by the sensor 220. For example, when it is determined that a user not understanding the transcription 210 within a threshold level of understanding based on key phrases in audio detected by the sensor 220 of the device 200, the transcription system may generate the summary 215 using a first process. When it is determined that a user is, however, understanding the transcription 210 within a threshold level of understanding, the system may generate the summary 215 using a second process. For example, the device 200 may generate a portion of the summary 215 via the computing system 225. In these and other embodiments, the summary 215, when the user is understanding within a threshold level of understanding the transcription 210, may be provided for display after the corresponding communication session. Additionally or alternatively, for example, the device 200 may generate the summary 215 without the transcription system and/or network via the computing system 225.

Different processes of generating the summary may include using different methods of summary generation such as a re-voicing system, human transcription, text-based recognition, automated summary generation systems, and/or combinations thereof. For example, when it is determined that a user is not understanding the transcription 210 within a threshold level of understanding, the transcription system may generate the summary 215 using a re-voicing system that includes, for instance, a human-interpreted summary of the transcription 210. When it is determined that a user is understanding the transcription 210, the transcription system may generate the summary 215 using an automated summary generation system configured to perform text extraction and/or text abstraction of the transcription 210. Alternatively or additionally, the different processes of generating the summary 215 may include whether the transcription 210 and/or the summary 215 are corrected after generation but before presentation.

In some embodiments, a transcription system may generate the summary 215 of the transcription 210 of a communication session regardless of the whether a user is determined to be understanding the transcription 210 within a threshold level of understanding. In these and other embodiments, the transcription system may provide the summary 215 to the device 200 based on communications from the device 200 regarding summary presentation. In these and other embodiments, the transcription system may store an entirety of the summary 215. Alternatively or additionally, the device 200 may direct presentation of the summary 215 at the display 205 regardless of whether the user is determined to be understanding the transcription 210 within a threshold level of understanding. In some embodiments, the transcription system may not be aware that the summary 215 is presenting or not being presented at the device 200.

In these or other embodiments, summary presentation may be available upon command. Additionally or alternatively, summary presentation may correspond to a point in the communication session prior to an event, a point in the communication session matched to the time of an event, or a point in the communication session after an event. The summary presentation may be adjusted according to personal settings, may include default settings, or may be based on some combination thereof.

Modifications, additions, or omissions may be made to the device 200 without departing from the scope of the present disclosure. For example, the device 200 may include the interface element (e.g., buttons). Additionally or alternatively, the display 205 may be an interactive display, such as a touch screen display or a virtual reality environment. In these and other embodiments, a user may interface with the device 200 through the display 205. Alternately or additionally, a user may interact with the device 200 using voice commands.

Alternatively or additionally, the determinations made by the device 200 as described with respect to FIG. 2 may be made by another system or device. For example, a transcription system may make a determination to present the summary 215 based on data from sensors of the device 200. In these and other embodiments, the device 200 may present the summary 215 or not present the summary 215 based on commands from the transcription system.

Alternatively or additionally, the summary 215 may vary in context. For example, the summary 215 may vary in context based on the level of the summarization. In some embodiments, the summary 215 may be summarized to replace words that over a particular number of letters and/or words that are not in of list of frequently used words. The words to be replaced may be replaced with synonym words that in the list of frequently used words and/or that are less than the particular number of letters. For example, the words "arcane" may not be in a list of frequently used words and may be replaced with the synonym of "mysterious." As another example, the word "superfluous" may be longer than a threshold of ten letters and may be replaced with the word "extra."

In some embodiments, the summary 215 may be summarized to remove between zero and fifty percent of the words. Alternately or additionally, the summary 215 may be summarized to remove more than fifty percent of the words. In these and other embodiments, the summary 215 may be summarized in a bullet point fashion.

In some embodiments, the summary 215 may vary in context based on a determined ability of the user of the device 200. For example, the device 200 may use the information from the sensor 220 to determine a level of understanding of the user. In response to a level of understanding of the user satisfying a first threshold, the summary 215 may include first context. In response to the level of understanding of the user satisfying a second threshold, the summary 215 may include second context and in response to the level of understanding of the user satisfying a third threshold, the summary 215 may include third context. Thus, the device 200 may vary the context of the summary 215 of the transcription 210 based on a perceived level of understanding of the user.

Alternatively or additionally, the transcription 210 may be tagged with one or more words from the summary 215. For example, the summary 215 may be further summarized to determine key points of the summary 215. The key points of the summary 215 may be used as tags for the transcription 210. The tags for the transcription 210 may be used for searching for the transcription 210 from among multiple transcriptions that may be saved on the device 200. Thus, the summary 215 may be used to assist in providing metadata for the transcription 210.

Alternately or additionally, the summary 215 may be associated with the transcription 210. In these and other embodiments, a search of multiple summaries that include the summary 215 may be made on the device 200. Based on the reduced word count of the summaries, the summaries may be easier to search than transcriptions stored on the device 200. In these and other embodiments, a transcription associated with a summary that results from the search of the summaries may be provide as a search result.

Figure 3B:
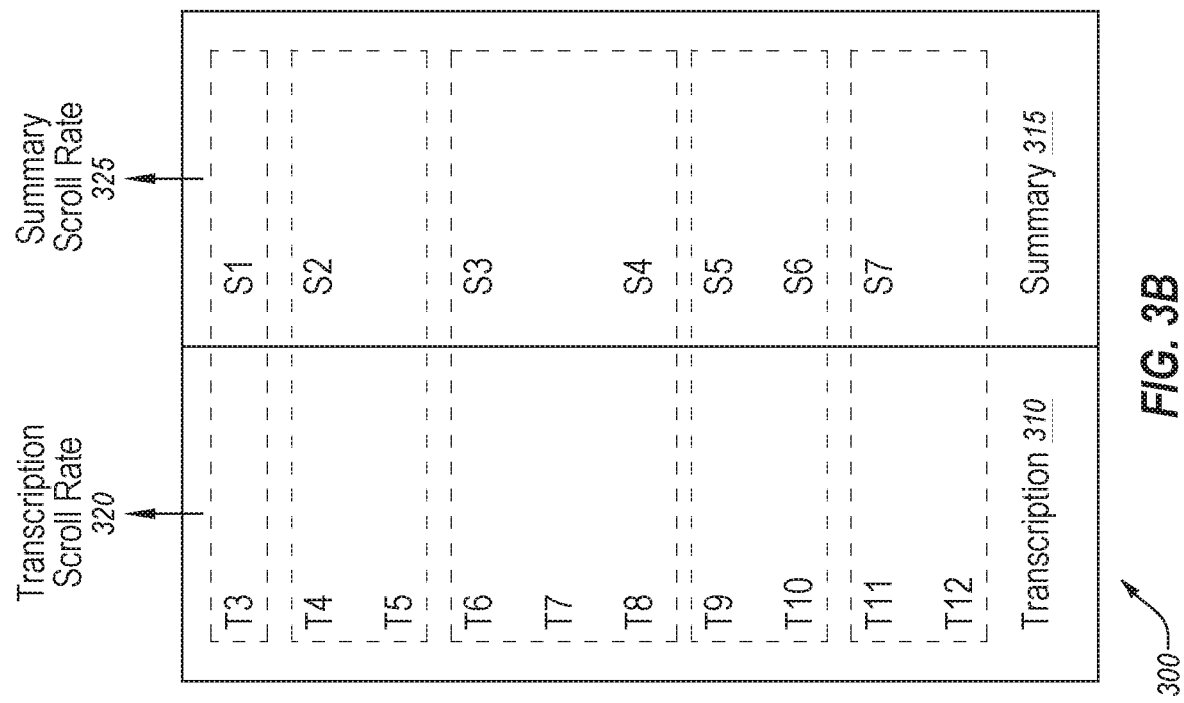
FIG. 3B illustrates another example display of the device at a second point in the communication session.
Figure 3A:
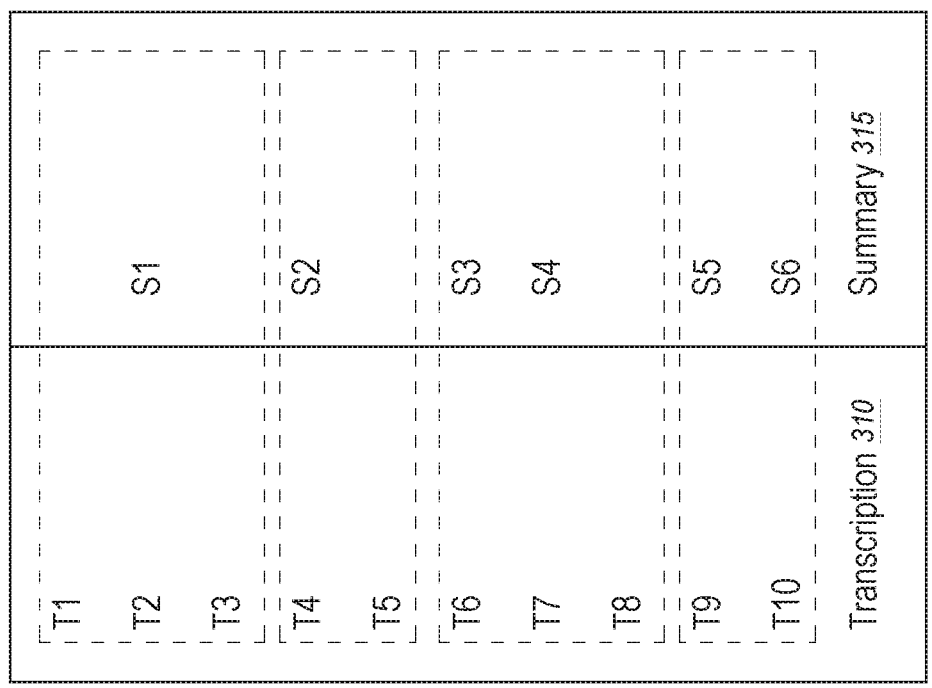
FIG. 3A illustrates an example display of a device at a first point in a communication session.

FIGS. 3A and 3B illustrate an example display 300 of a device at respective example points in a communication session. The display 300 may be arranged accordance with at least one embodiment described in the present disclosure. The display 300 may be the same as or similar to the display 205 of FIG. 2. As illustrated, the display 300 may include a transcription 310, a summary 315, a transcription scroll rate 320, and a summary scroll rate 325. In these or other embodiments, the transcription 310 and the summary 315 may be the same as or similar to the transcription 210 and the summary 215, respectively, of FIG. 2.

In some embodiments, the transcription 310 and the summary 315 may be presented simultaneously at the display 300. For example, the transcription 310 and the summary 315 may be visually associated together when presented at the display 300 at a same time during a communication session. Being visually associated together may include any manner in which the transcription 310 and the summary 315 may visually correspond to each other. For example, in FIG. 3A, S1 of the summary 315 may be an example summary of T1-T3, which are example portions of the transcription 310. 51 and T1-T3 may be visually associated together according to color coordination, arrows, connecting lines, fonts, time stamps, enclosed shapes (e.g., circles, squares, etc.), a positional relationship (e.g., relative alignment with each other), identifiers (e.g., shapes, signatures, acronyms, codes, etc.), and/or any other suitable type of visual association between the transcription 310 and the summary 315.

Additionally or alternatively, S2 of the summary 315 may be an example summary of T4-T5, which are example portions of the transcription 310. S2 and T4-T5 may be visually associated together in a same or similar manner as S1 and T1-T3 are visually associated together. In other embodiments, S2 and T4-T5 may be visually associated together in different manner than S1 and T1-T3 are visually associated together. For example, S1 and T1-T3 may be visually associated together by being enclosed by a rectangular shape, while S2 and T4-T5 may be visually associated together by being of a blue color font without being enclosed by a rectangular shape. Additionally or alternatively, an alternating embodiment may be implemented in the display 300. For instance, continuing with the above example, S3-S4 may be an example summary of T6-T8, which are example portions of the transcription 310. Additionally, S5-S6 may be an example summary of T9-T10, which are example portions of the transcription 310. In this example scenario, S3-S4 and T6-T8 may be visually associated together by being enclosed by a rectangular shape, and S5-S6 and T9-T10 may be visually associated together by being of a blue color font without being enclosed by a rectangular shape. In this manner, the associating visual relationships between portions of the summary 315 and portions of the transcription 310 may be alternating in nature. Additionally or alternatively, other suitable visual associations between portions of the summary 315 and portions of the transcription 310 may be implemented. For example, an offset or staggering visual association may be implemented.

In some embodiments, transcription presentation and summary presentation may include presenting the transcription 310 and the summary 315 such that both scroll along the display 300 as the communication proceeds. For example, relative to an example plane of the display 300, the transcription 310 and the summary 315 may move along the display 300 in an upwards manner (e.g., +Y direction), a downwards manner (e.g., −Y direction), a side-to-side manner (e.g., +/−X direction), into or out of the display 300 (e.g., +/−Z direction), or any combination thereof. Additionally or alternatively, the transcription 310 and the summary 315 may have one or more three-dimensional aspects as perceived by a user viewing the display 300. For example, the display 300 may be a three-dimensional display, a virtual reality headset, or other multi-dimensional display. In these or other embodiments, the transcription 310 and the summary 315 may move along the display 300 in any manner as desired (e.g., according to user preferences), according to a linguistic direction of reading, according to a speed of conversation, according to a reading level of the user, according to an age of the user, according to regulatory or legal limits, etc.

In some embodiments, the transcription 310 and the summary 315 may be scrolled along the display 300 at a particular speed. For example, the transcription 310 may move along the display 300 at the transcription scroll rate 320, and the summary 315 may move along the display 300 at the summary scroll rate 325. In some embodiments, the transcription scroll rate 320 and the summary scroll rate 325 may be the same speed, while in other embodiments, different speeds. For example, the summary scroll rate 325 may be a slower speed than the transcription scroll rate 320. In these or other embodiments, the smaller amount of content of the summary 315, compared to the transcription 310, may help enable the summary 315 to be scrolled slower than the transcription 310. Additionally or alternatively, the summary scroll rate 325 being slower than the transcription scroll rate 320 may facilitate increased ease of understanding of the summary 315. FIG. 3B illustrates an example of the transcription scroll rate 320 and the summary scroll rate 325. Though T1-T2 are no longer visible on the display 300, S1 is still visible. Additionally or alternatively, T11-T12 as example portions of the transcription 310 have become visible on the display 300, including S7 as an example summary of T11-T12. In this example scenario, a change in the transcription 310 amounts to four lines, four paragraphs, four sections, etc. (computed by an example expression: $\Delta change\ p=|−2+2|$) as a result of T1-T2 being removed from the display 300 and T11-T12 being added to the display 300. A change in the summary 315 amounts to one line, one paragraph, one section, etc. (computed by an example expression: $\Delta change=|+1|$) as a result of S7 being added to the display 300 and no portion of the summary 315 being removed from the display 300.

Additionally or alternatively, one or both of the summary scroll rate 325 and the transcription scroll rate 320 may be set at default settings, customized according to user preferences, and/or adjusted on-the-fly according to an indication of an event such as user misunderstanding.

Figure 4:
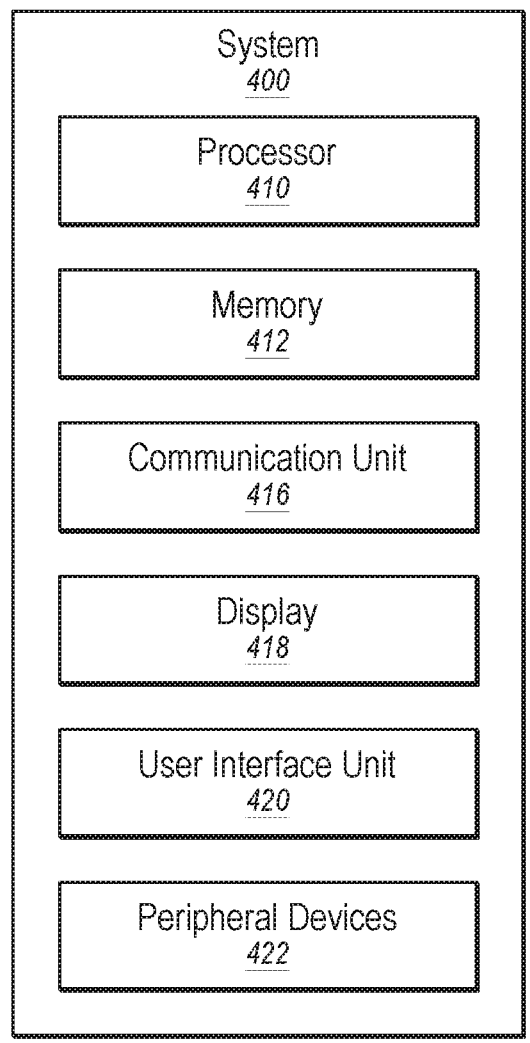
FIG. 4 illustrates an example system that may be used in the presentation of a summary of a transcription.

FIG. 4 illustrates an example system 400 that may be used in the presentation of a summary of a transcription. The system 400 may be arranged in accordance with at least one embodiment described in the present disclosure. The system 400 may include a processor 410, memory 412, a communication unit 416, a display 418, a user interface unit 420, and a peripheral device 422, which all may be communicatively coupled. In some embodiments, the system 400 may be part of any of the systems or devices described in this disclosure.

For example, the system 400 may be part of the first and second devices 104 and 106 of FIG. 1 and the device 200 of FIG. 2 and may be configured to perform one or more of the tasks described above with respect to one or more of the first device 104, the second device 106, and/or the device 200. As another example, the system 400 may be part of the second device 106 of FIG. 1 and may be configured to perform one or more of the tasks described above with respect to the second device 106. As another example, the system 400 may be part of the transcription system 130 of FIG. 1 and may be configured to perform one or more of the tasks described above with respect to the transcription system 130.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 410 may include any number of processors distributed across any number of networks or physical locations that are configured to perform individually or collectively any number of operations described in this disclosure. In some embodiments, the processor 410 may interpret and/or execute program instructions and/or process data stored in the memory 412. In some embodiments, the processor 410 may execute the program instructions stored in the memory 412.

For example, in some embodiments, the processor 410 may execute program instructions stored in the memory 412 that are related to determining whether generated sensory data indicates an event and/or determining whether the event is sufficient to determine that the user is understanding the transcription within a threshold level of understanding such that the system 400 may perform or direct the performance of the operations associated therewith as directed by the instructions. In these and other embodiments, instructions may be used to perform one or more operations of the methods 500 or 600 of FIGS. 5 and 6 described below.

The memory 412 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 410. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuijten,* 500 F.3d 1346 (Fed. Cir. 2007). Combinations of the above may also be included within the scope of computer-readable media.

The communication unit 416 may include any component, device, system, or combination thereof that is configured to transmit or receive information over a network. In some embodiments, the communication unit 416 may communicate with other devices at other locations, the same location, or even other components within the same system. For example, the communication unit 416 may include a modem, a network card (wireless or wired), an infrared communication device, a wireless communication device (such as an antenna), and/or chipset (such as a Bluetooth device, an 802.6 device (e.g., Metropolitan Area Network (MAN)), a Wi-Fi device, a WiMax device, cellular communication facilities, etc.), and/or the like. The communication unit 416 may permit data to be exchanged with a network and/or any other devices or systems described in the present disclosure. For example, when the system 400 is included in the first device 104 of FIG. 1, the communication unit 416 may allow the first device 104 to communicate with the transcription system 130.

The display 418 may be configured as one or more displays, like an LCD, LED, or other type of display. The display 418 may be configured to present video, text captions, user interfaces, and other data as directed by the processor 410. For example, when the system 400 is included in the first device 104 of FIG. 1, the display 418 may be configured to present second video from a second device, a transcript of second audio from the second device, and/or a selectable element.

The user interface unit 420 may include any device to allow a user to interface with the system 400. For example, the user interface unit 420 may include a mouse, a track pad, a keyboard, buttons, a microphone for voice commands, and/or a touchscreen, among other devices. The user interface unit 420 may receive input from a user and provide the input to the processor 410. In some embodiments, the user interface unit 420 and the display 418 may be combined.

The peripheral devices 422 may include one or more devices. For example, the peripheral devices may include a sensor, a microphone, and/or a speaker, among other peripheral devices. In these and other embodiments, the microphone may be configured to capture audio. The speaker may broadcast audio received by the system 400 or otherwise generated by the system 400. The sensor may be configured to sense changes in light, sound, motion, rotation, position, orientation, magnetization, acceleration, tilt, vibration, changes in facial expression, movement of the eyes, voice tone, etc.

Modifications, additions, or omissions may be made to the system 400 without departing from the scope of the present disclosure. For example, in some embodiments, the system 400 may include any number of other components that may not be explicitly illustrated or described. Further, depending on certain implementations, the system 400 may not include one or more of the components illustrated and described.

Figure 5:
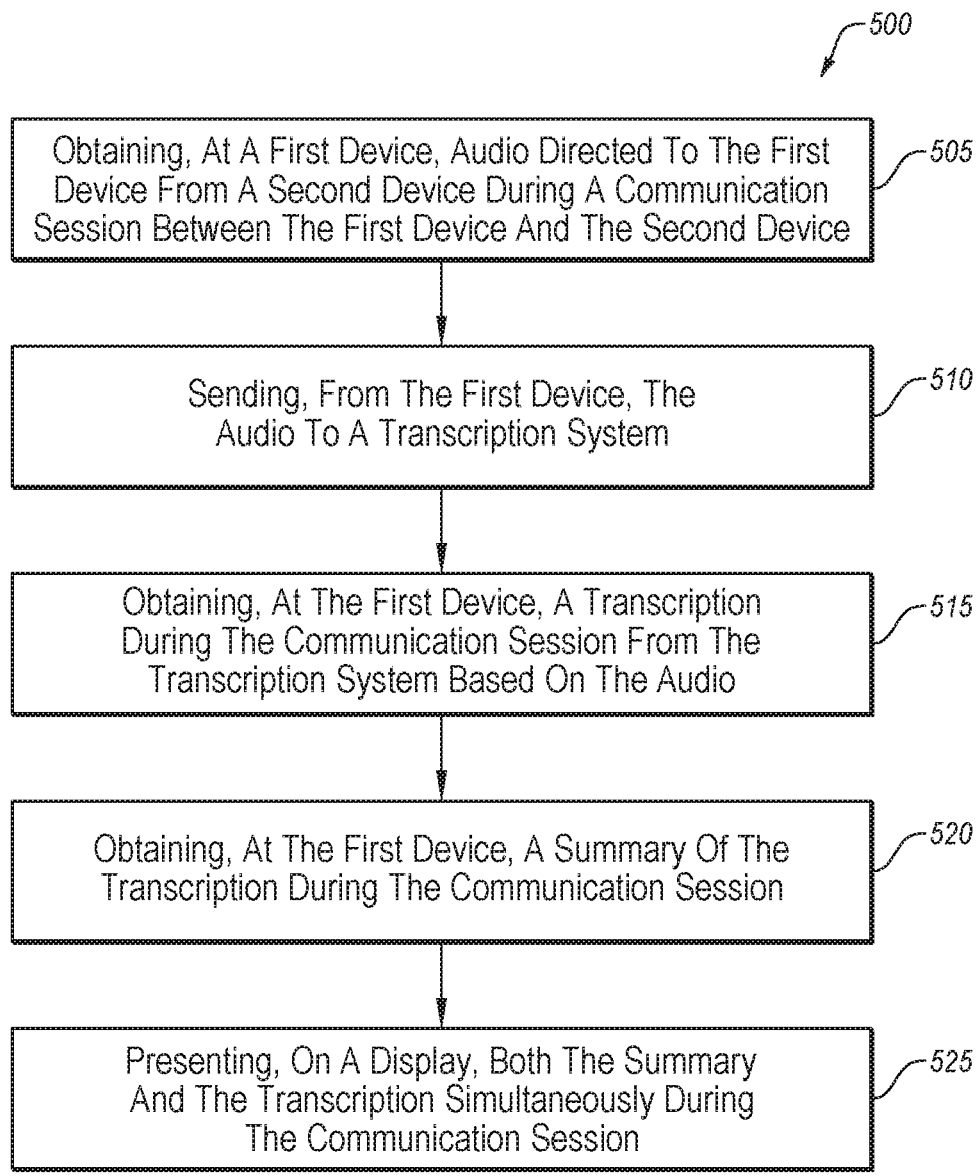
FIG. 5 is a flowchart of an example method to present a summary of a transcription.

FIG. 5 is a flowchart of an example method 500 to present a summary of a transcription. The method 500 may be arranged in accordance with at least one embodiment described in the present disclosure. The method 500 may be performed, in some embodiments, by a device or system, such as the first device 104 of FIG. 1 or the system 400 of FIG. 4, or another device or system. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 505, at which audio directed to the first device from a second device may be obtained during a communication session between the first device and the second device. For example, the first device may obtain the first audio from a microphone of the first device or from another device that is communicatively coupled to the first device. Additionally or alternatively, the second device may be configured to obtain a second audio directed to the second device from the first device. For example, the second device may obtain the second audio from a microphone of the second device or from another device communicatively coupled to the second device.

At block 510, the audio obtained at block 505 may be sent to a transcription system. In these or other embodiments, one or both of the first device and the second device may be configured to provide the first audio, the second audio, or both the first audio and the second audio to the transcription system.

At block 515, a transcription may be obtained during the communication session from the transcription system based on the audio sent to the transcription system at block 510. In some embodiments, the transcription system may be configured to generate a transcription of the audio received from either one or both of the first device and the second device. Additionally or alternatively, the transcription system may provide the generated transcription of the audio to either one or both of the first device and the second device. The transcription system may be configured to generate a transcription of audio using a speech recognition system and/or using a re-voicing system.

At block 520, a summary of the transcription may be obtained during the communication session. In some embodiments, one or both of the first and second devices and may be configured to obtain a summary of the transcription. The summary of the transcription may include a simplified form of the transcription. In these or other embodiments, obtaining the summary at one or both of the first and second devices may include receiving the summary of the communication session from the transcription system. Additionally or alternatively, obtaining the summary at one or both of the first and second devices and may include generating the summary at the first device and/or second device based on the transcription. The summary may be generated using a summary generation system. In some embodiments, obtaining the summary of the transcription during the communication session and presenting the summary may be in response to an indication of an occurrence of an event associated with the communication session.

At block 525, both the summary and the transcription may be presented on a display simultaneously during the communication session. In some embodiments, summary presentation and transcription presentation may include scrolling both the transcription and the summary to move along the display as the communication proceeds. Additionally or alternatively, summary presentation and transcription presentation may include scrolling the summary at a first scroll rate and scrolling the transcription at a second scroll rate that is slower than the first scroll rate. In some embodiments, presenting the summary may be in response to an indication of an occurrence of an event associated with the communication session.

It is understood that, for this and other processes, operations, and methods disclosed in this disclosure, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, another block in the method 500 may include determining a level of user understanding of the transcription. In some embodiments, the event discussed in conjunction with blocks 520 and 525 may include the level of user understanding satisfying a threshold. In these or other embodiments, based on obtaining the indication of an event, the occurrence of and/or extent of the event may be inferred. In some embodiments, it may be inferred that the user does not understand the transcription based on data obtained, for example, at the first device that indicates the user may not understand the transcription. For instance, the following example data obtained may be used to determine that the user does or does not understand the transcription: a facial expression of a user associated with the first device; an increase in sound volume of the audio directed from the second device to the first device that exceeds a threshold sound volume; a number of repeated words in the audio directed from the second device to the first device that exceeds a threshold number of repeated words; and key phrases in the audio directed from the second device to the first device. Any inference or determination of the present disclosure may be programmed, created as rules, made adjustable in settings, stored, or rendered as computer executable instructions, among others.

In another example, an additional block in the method 500 may include ceasing to present the summary in response to an indication of an occurrence of another event associated with the communication session. In some embodiments, another event may include the level of user understanding satisfying a threshold. In these or other embodiments, based on obtaining the indication of an event, the occurrence of and/or extent of the event may be inferred. In some embodiments, it may be inferred that the user does understand the transcription based on data obtained, for example, at the first device that indicates the user may understand the transcription.

Figure 6:
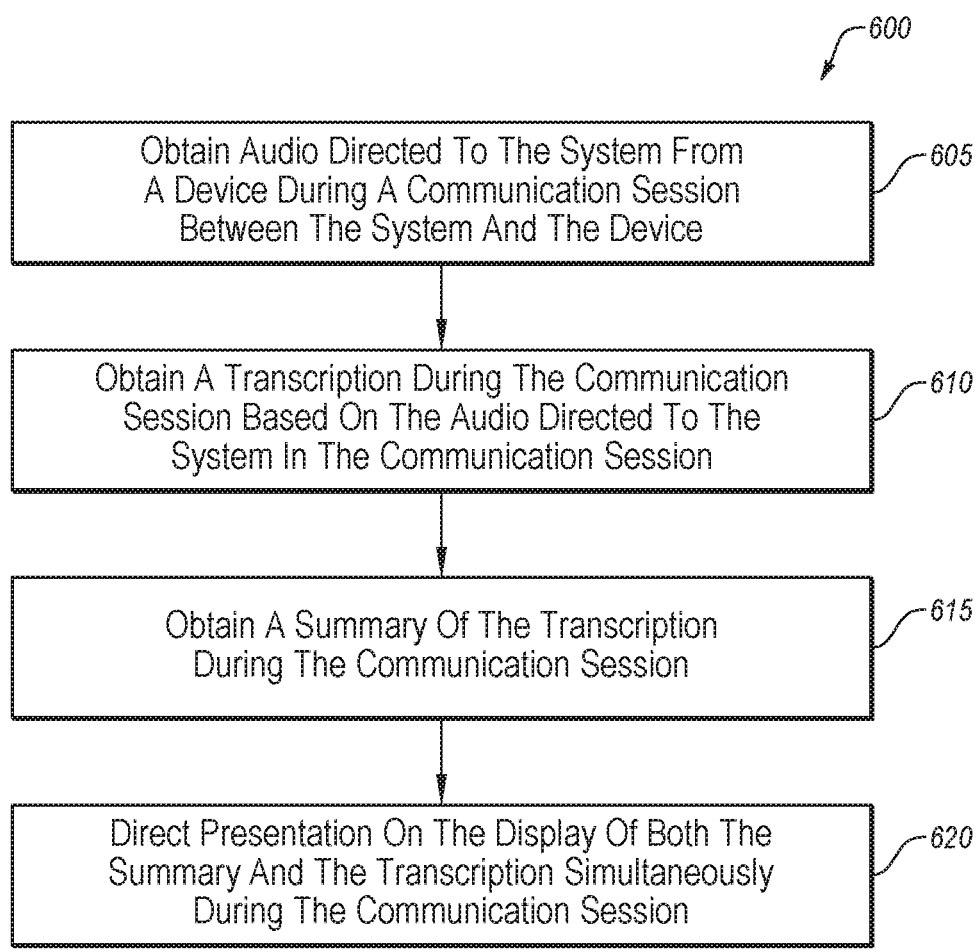
FIG. 6 is a flowchart of another example method to present a summary of a transcription.

FIG. 6 is a flowchart of another example method 600 to present a summary of a transcription. The method 600 may be arranged in accordance with at least one embodiment described in the present disclosure. The method 600 may be performed, in some embodiments, by a device or system, such as the first device 104 of FIG. 1 or the system 400 of FIG. 4, or another device or system. In these and other embodiments, the method 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 600 may begin at block 605, at which audio directed to the system from a device may be obtained during a communication session between the system and the device. For example, the device may obtain audio from a microphone of the device or from another device that is communicatively coupled to the device. The device may then direct the obtained audio to the system where the audio is received.

At block 610, a transcription may be obtained during the communication session based on the audio directed to the system in the communication session at block 605. In some embodiments, the system may be configured to generate a transcription of the audio received from the device. Additionally or alternatively, the system may be configured to generate a transcription of audio using a speech recognition system and/or using a re-voicing system.

At block 615, a summary of the transcription may be obtained during the communication session based on the audio directed to the system in the communication session. The summary of the transcription may include a simplified form of the transcription. In these or other embodiments, obtaining the summary at the system may include receiving the summary of the communication session from the device. Additionally or alternatively, obtaining the summary at the system may include generating the summary at the system based on the transcription. The summary may be generated using a summary generation system and/or an agent revoicing system. In some embodiments, obtaining the summary of the transcription during the communication session may be in response to an indication of an occurrence of an event associated with the communication session.

At block 620, presentation on a display of the device for both the summary and the transcription may be directed simultaneously during the communication session. In some embodiments, summary presentation and transcription presentation may include causing the scrolling of both the transcription and the summary to move along the display as the communication proceeds. Additionally or alternatively, summary presentation and transcription presentation may include causing the scrolling of the summary at a first scroll rate and the scrolling of the transcription at a second scroll rate that is slower than the first scroll rate. In some embodiments, summary presentation may be in response to an indication of an occurrence of an event associated with the communication session.

It is understood that, for this and other processes, operations, and methods disclosed in this disclosure, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, another block in the method 600 may include determining a level of user understanding of the transcription. In some embodiments, the event discussed in conjunction with blocks 615 and 620 may include the level of user understanding satisfying a threshold. In these or other embodiments, based on obtaining the indication of an event, the occurrence of and/or extent of the event may be inferred. In some embodiments, it may be inferred that the user does not understand the transcription based on data obtained, for example, at the system that indicates the user may not understand the transcription. For instance, the following example data obtained may be used to determine that the user does or does not understand the transcription: a facial expression of a user associated with the first device; an increase in sound volume of the audio directed from the second device to the first device that exceeds a threshold sound volume; a number of repeated words in the audio directed from the second device to the first device that exceeds a threshold number of repeated words; and key phrases in the audio directed from the second device to the first device. Any inference or determination of the present disclosure may be programmed, created as rules, made adjustable in settings, stored, or rendered as computer executable instructions, among others.

In another example, an additional block in the method 600 may include ceasing to direct the presentation of the summary in response to an indication of an occurrence of another event associated with the communication session. In some embodiments, another event may include the level of user understanding satisfying a threshold. In these or other embodiments, based on obtaining the indication of an event, the occurrence of and/or extent of the event may be inferred. In some embodiments, it may be inferred that the user does understand the transcription based on data obtained, for example, at the system that indicates the user may understand the transcription.

As indicated above, the embodiments described in this disclosure may include the use of a special purpose or general purpose computer (e.g., the processor 410 of FIG. 4) including various computer hardware or software modules, as discussed in greater detail below. Further, as indicated above, embodiments described in this disclosure may be implemented using computer-readable media (e.g., the memory 412 of FIG. 4) for carrying or having computer-executable instructions or data structures stored thereon.

In some embodiments, the different components, modules, engines, and services described in this disclosure may be implemented as objects or processes that execute on a computing system (e.g., as separate threads). While some of the systems and methods described in this disclosure are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in this disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in this disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in this disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
obtaining, at a first device, audio directed to the first device from a second device during a communication session between the first device and the second device;
sending, from the first device, the audio to a transcription system;
obtaining, at the first device, a transcription during the communication session from the transcription system based on the audio;
obtaining a level of user understanding of the transcription, the level of the user understanding of the transcription being determined based on behavior of the user;
in response to the level of user understanding satisfying a threshold, obtaining, at the first device, a summary of the transcription during the communication session; and
presenting, on a display, both the summary and the transcription simultaneously during the communication session.

2. The method of claim 1, wherein obtaining the summary of the transcription includes the first device generating the summary during the communication session using the transcription of the communication session.

3. The method of claim 1, wherein the summary and the transcription are presented on the display in a manner such that a portion of the transcription and a portion of the summary that is derived from the portion of the transcription are visually associated together.

4. The method of claim 1, wherein the presentation includes scrolling both the transcription and the summary to move along the display as the communication session proceeds.

5. The method of claim 4, wherein the presentation includes scrolling the summary at a first scroll rate and scrolling the transcription at a second scroll rate that is different than the first scroll rate.

6. The method of claim 5, wherein the first scroll rate is slower than the second scroll rate.

7. The method of claim 1, further comprising ceasing to present the summary in response to an indication of an occurrence of an event associated with the communication session.

8. The method of claim 1, wherein the behavior of the user used to determine the level of the user understanding of the transcription includes one or more of: facial expressions of the user, audio levels of the user, words spoken by the user, and the user reading the transcription.

9. A system comprising:
a display;
a processor coupled to the display and configured to direct data to be presented on the display; and
at least one non-transitory computer-readable media communicatively coupled to the processor and configured to store one or more instructions that when executed by the processor cause or direct the system to perform operations comprising:
obtain audio directed to the system from a device during a communication session between the system and the device;
obtain a transcription during the communication session based on the audio directed to the system in the communication session;
obtain a level of user understanding of the transcription, the level of the user understanding of the transcription being determined based on behavior of the user;
in response to the level of user understanding satisfying a threshold, obtain a summary of the transcription during the communication session; and
direct presentation on the display of both the summary and the transcription simultaneously during the communication session.

10. The system of claim 9, wherein the operation to obtain the summary of the transcription includes the device generating the summary during the communication session using the transcription of the communication session.

11. The system of claim 9, wherein the summary and the transcription are directed to present on the display in a manner such that a portion of the transcription and a portion of the summary that is derived from the portion of the transcription are visually associated together.

12. The system of claim 9, wherein the operation to direct the presentation includes causing scrolling of both the transcription and the summary such that both the transcription and the summary move along the display as the communication session proceeds.

13. The system of claim 12, wherein the operation to direct the presentation includes causing scrolling of the summary at a first scroll rate and scrolling of the transcription at a second scroll rate that is different than the first scroll rate.

14. The system of claim 13, wherein the first scroll rate is slower than the second scroll rate.

15. The system of claim 9, wherein the operations further comprise cease directing presentation of the summary in response to an indication of an occurrence of another event associated with the communication session.

16. The system of claim 9, wherein the behavior of the user used to determine the level of the user understanding of the transcription includes one or more of: facial expressions of the user, audio levels of the user, words spoken by the user, and the user reading the transcription.

17. A system comprising:
a processor; and
at least one non-transitory computer-readable media communicatively coupled to the processor and configured to store one or more instructions that when executed by the processor cause or direct the system to perform operations comprising:
   obtain audio directed to a first device from a second device during a communication session between the first device and the second device;
   obtain a transcription during the communication session based on the audio of the communication session;
   provide the transcription to the first device for presentation of the transcription;
   obtain a level of user understanding of the transcription, the level of the user understanding of the transcription being determined based on behavior of the user; and
   in response to the level of user understanding satisfying a threshold, provide a summary of the transcription to the first device for presentation of both the summary and the transcription simultaneously during the communication session.

18. The system of claim 17, wherein the operations further comprise cease providing the summary in response to an indication of an occurrence of another event associated with the communication session.

19. The system of claim 17, wherein the behavior of the user used to determine the level of the user understanding of the transcription includes one or more of: facial expressions of the user, audio levels of the user, words spoken by the user, and the user reading the transcription.

20. The system of claim 17, wherein the presentation includes scrolling the summary at a first scroll rate and scrolling the transcription at a second scroll rate that is different than the first scroll rate.

* * * * *